United States Patent
Passmann et al.

(10) Patent No.: US 9,855,711 B2
(45) Date of Patent: Jan. 2, 2018

(54) METHOD FOR MANUFACTURING A COMPOSITE PANEL

(71) Applicant: SIEMENS AKTIENGESELLSCHAFT, München (DE)

(72) Inventors: Dirk Passmann, Oberhausen (DE); Kim Klausen, Odense N. (DK); Karsten Schibsbye, Fredericia (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/350,204

(22) PCT Filed: Oct. 8, 2012

(86) PCT No.: PCT/EP2012/069856
§ 371 (c)(1),
(2) Date: Apr. 7, 2014

(87) PCT Pub. No.: WO2013/053667
PCT Pub. Date: Apr. 18, 2013

(65) Prior Publication Data
US 2014/0246151 A1    Sep. 4, 2014

(30) Foreign Application Priority Data
Oct. 11, 2011  (EP) .................................... 11184632

(51) Int. Cl.
*B32B 37/00* (2006.01)
*B29C 70/68* (2006.01)
(Continued)

(52) U.S. Cl.
CPC ............ *B29C 70/68* (2013.01); *B29C 70/222* (2013.01); *B32B 5/245* (2013.01); *B32B 37/14* (2013.01);
(Continued)

(58) Field of Classification Search
CPC ..... B29C 66/727; B29C 70/086; B29C 70/68; B29C 70/685; Y10T 156/1089; Y10T 156/109; Y10T 156/1093
(Continued)

(56) References Cited

U.S. PATENT DOCUMENTS 3,339,326 A  *  9/1967  Derr et al. ................. 52/309.11
3,544,417 A     12/1970  Corzine et al.
(Continued)

FOREIGN PATENT DOCUMENTS

DE   19515928 A1  *  11/1996
EP    1310351 A1     5/2003
(Continued)

OTHER PUBLICATIONS

Machine translation of DE 19515928 date unknown.*
(Continued)

*Primary Examiner* — John Goff
(74) *Attorney, Agent, or Firm* — Schmeiser Olsen & Watts LLP

(57) ABSTRACT

ABSTRACT OF THE DISCLOSURE A method of manufacturing a composite panel comprises the steps of:
a) Providing a first textile layer (10);
b) Applying a first adhesive to at least a portion of the first textile layer (10);
c) Placing a plurality of first profiles (11) adjacent to each other onto at least a portion of the first textile layer which has been contacted with the first adhesive,
  wherein each of the first profiles (11) comprises a foam core (12) and a reinforcement fabric (13) located on the foam core (12) and
  wherein each of the first profiles (11) is obtained by bonding a respective foam core (12) to a respective pre-formed reinforcement fabric (13);
(Continued)

d) Applying a second adhesive to at least a portion of the reinforcement fabrics (13) of the first profiles (11);
e) Placing, at least once, at least one second profile (14) between two first profiles (11); and
f) Providing a second textile layer (15) onto the at least one second profile (14).

The invention also relates to a composite panel obtainable by such a method and to the use of a such a composite panel for the manufacture of rotor blades for wind energy systems, of panels for reefer containers or of panels for trailers.

11 Claims, 4 Drawing Sheets

(51) Int. Cl.
*B29C 70/22* (2006.01)
*B32B 5/24* (2006.01)
*B32B 37/14* (2006.01)

(52) U.S. Cl.
CPC .................. *Y10T 156/1089* (2015.01); *Y10T 428/249982* (2015.04)

(58) Field of Classification Search
USPC .......................................... 156/64, 210, 324
See application file for complete search history.

(56) References Cited

U.S. PATENT DOCUMENTS

| | | | |
|---|---|---|---|
| 4,416,715 A * | 11/1983 | Schramm | B29D 24/002 156/210 |
| 5,425,908 A * | 6/1995 | Merser | B27G 11/00 156/78 |
| 5,429,066 A | 7/1995 | Lewit et al. | |
| 5,589,243 A | 12/1996 | Day et al. | |
| 5,908,591 A | 6/1999 | Lewit et al. | |
| 6,824,851 B1 * | 11/2004 | Locher et al. | 428/76 |
| 2002/0178992 A1 | 12/2002 | Lewit et al. | |
| 2007/0293112 A1 * | 12/2007 | Hanson | B32B 3/28 442/381 |
| 2008/0127604 A1 * | 6/2008 | Schiffmann et al. | 52/745.2 |
| 2009/0202776 A1 | 8/2009 | Brandon et al. | |
| 2009/0209671 A1 * | 8/2009 | Emge et al. | 521/98 |
| 2012/0244006 A1 | 9/2012 | Passmann et al. | |

FOREIGN PATENT DOCUMENTS

| | | | |
|---|---|---|---|
| JP | 62270330 A * | 11/1987 | |
| WO | 2009/102414 A1 | 8/2009 | |
| WO | 2011069975 A1 | 6/2011 | |

OTHER PUBLICATIONS

Office Action for Chinese Application No. 201280060892.3, dated Jun. 20, 2016.

Chinese language Office Action and the English translation for Chinese Application No. CN 201280060892.3, dated Feb. 15, 2017.
Machine translation of JP62270330 date unknown.

* cited by examiner

METHOD FOR MANUFACTURING A COMPOSITE PANEL

CROSS REFERENCE TO RELATED APPLICATIONS

This application is a §371 National Stage Application of PCT/EP2012/069856, filed Oct. 8, 2012 which claims priority to EP 11184632.5, filed Oct. 11, 2011.

BACKGROUND

Field of the Invention

The present invention relates to a method of manufacturing a composite panel, a composite panel obtainable by such a method and to the use of a such a composite panel for the manufacture of rotor blades for wind energy systems, of panels for reefer containers or of panels for trailers.

Description of Related Art

The importance of wind energy is increasing steadily. This leads to an intense research into and further development of wind energy systems, especially into the rotor blades of such wind energy systems. A key consideration is the quality of the rotor blades and their economical production. Currently known rotor blades for wind energy systems are made from fiber reinforced materials based on resins as a matrix material, for example polyester resins (UP), vinyl ester resins (VE) or epoxy resins (EP). The production of the rotor blades is essentially the one-piece assembly of a lower side and an upper side which are placed on top of each other and bonded together. Stiffeners or belts may be included in the interior for added stability.

In this production of the rotor blade halves fiber reinforced composites are first prepared which need to harden. This hardening process is time-consuming and detrimental for a rapid overall production. Generally the rotor blades for wind energy systems using the aforementioned resins are made using techniques such as hand lamination, hand lamination with prepreg technology, wrapping or resin-assisted vacuum infusion. During hand lamination first a mold is prepared by applying a form release agent and optionally a gel coat onto the mold surface. Then glass fabrics with unidirectional or biaxial orientation are placed into the mold. A resin is applied and manually spread throughout the glass fabric by rollers. This step can be repeated as desired. Additional reinforcement elements such as belts or other components such as lightning protection can also be incorporated.

The hand lamination process using prepreg technology is similar to the hand lamination process. So-called prepregs (resin impregnated fiber mats) are prepared outside of the mold and are then placed into the rotor blade mold. This partial automation with respect to simple hand lamination processes have the benefit of a more constant production quality but workplace safety precautions must be applied when volatile organic compounds are involved.

In resin injection processes (also known as resin transfer molding (RTM), vacuum assisted resin transfer molding (VA RTM) or SCRIMP (Seemann composites resin infusion molding process)) the molds are prepared the molds are prepared by applying a release agent and optionally a gel coat. Then the dry fabrics are placed into the mold according to an exact plan. The layer which has been placed into the mold first will become the outermost layer of the product obtained such as a rotor blade.

Then a so-called distance layer is placed onto this first fiber reinforced layer. This distance layer is usually a balsa wood, polyvinyl chloride (PVC) foam or polyurethane (PUR) foam layer. Then a second (glass) fiber reinforced layer and optionally layers of other adjuvants are placed into the mold in an analog way as the first layer. The mold is sealed against vacuum and the air contained within the layers and distance materials is removed before resin is injected into the mold.

It is also possible that the elements of the distance layer also incorporate a (glass) fiber material. The production of these distance elements may be via a two-step wrapping process in which pre-fabricated foamed profiles are equipped with a (glass) fiber layer.

U.S. Pat. No. 3,544,417 is directed towards a cellular foam core assembly, the combination of: said assembly including at least one cellular foam core structure; each cellular foam core structure of said assembly including a series of generally parallel, longitudinally extending and generally transversely aligned foam cores, each core being preformed of a closed cell plastic foam material of a defined transverse cross section with all surfaces in transverse cross section being substantially flat, each core in transverse cross section having at least a lower base side and generally oppositely transversely, facing sides; each cellular foam core structure of said assembly including a primary base layer of fabric extending substantially continuously transversely and longitudinally along and fully contacting and covering said foam core lower base side, said primary base layer abutting said foam core lower base side and extending transversely between said foam cores substantially free of upward projection between said foam cores; each cellular foam core structure of said assembly including a primary covering layer of fabric extending substantially continuously upwardly over and downwardly transversely between said foam cores, said primary covering layer abutting all of said foam core oppositely transversely facing sides free of abutment with said foam core lower base slides and contacting said primary base layer at transverse extremities of each of said foam cores at said primary base layer completing said foam core longitudinal and transverse covering; each cellular foam core structure of said assembly including a generally longitudinally extending line of stitching at each of said foam core transverse extremities securing said primary base and covering layers together at said primary base layer and transversely between each transversely adjacent set of said foam cores of said each cellular foam core structure; said assembly including a lower secondary covering layer of fabric extending generally continuously transversely and longitudinally along fully contacting and covering said primary base layer of said at least one cellular foam core structure of said assembly, said lower secondary covering layer being free of upward projection transversely between any foam cores of said assembly; said assembly including an upper secondary covering layer of fabric extending generally continuously transversely being resin bonded thereto, said upper secondary cover and longitudinally along said assembly overlying and upwardly covering those parts of said primary covering layer of said at least one cellular foam core structure of said assembly at upper extremities of said foam cores thereof, said upper secondary covering layer being free of downward projection transversely between any foam cores of said assembly; said assembly including cellular foam core structure cores of said assembly being closely transversely adjacent one to the next transversely adjacent core with the primary covering layer of each core abutting the primary covering layer of that core's next transversely adjacent core; and cured resin covering, impregnating and rigidifying all of said base and covering layers of said assembly throughout said layers including said stitching, said cured resin bonding between said layers at said stitching and at all other areas of abutment between said layers rigidifying and bonding said assembly.

Reinforced foam cores are disclosed in U.S. Pat. No. 5,589,243. This patent relates to rigid foam boards and alternating absorptive fibrous web sheets which are adhered to form core panels or billets. Porosity is maintained in the webs for forming integral structural ties by absorbing resin applied to overlying sandwich panel skins. Beveled foam recesses adjacent web edge portions form structural resin fillets, and protruding edge portions form expanded connections to the skins Core panels oriented with their webs crossing are layered with web sheets to form enhanced panels. Boards or core panels and web sheets arranged in inclined stacks form second core panels having webs intersecting panel edges or faces at acute angles. Boards of alternating different physical properties and web sheets are bonded to form reinforced panels having differing interior and exterior densities. Compressible foam panels are used in place of or with web sheets to make bendable core panels. Foam between web edge portions is recessed for bonding a settable material to the edge portions.

U.S. Pat. No. 5,429,066 describes a composite structure and method of making the composite structure. A reinforcing fabric such as fiberglass is mechanically attached, for example, by stitching to a non-woven polyester fabric. The attached fabrics are placed in a mold with the non-woven fabric facing the inside of the mold. A self-expanding, self-curing foam is filled into the mold in an amount sufficient so that upon expansion in the closed mold, the foam penetrates into the interstices of the non-woven fabric which upon curing forms a bond therewith. The resulting structure can be used in a number of applications wherein the reinforcing fabric is later impregnated, for example, with a resin, and allowed to cure. Typical use of such a structure is as a stringer in fiberglass boat construction.

U.S. Pat. No. 5,908,591 is concerned with a method for making a composite structure, comprising the steps of: arranging a fabric layer in a configuration constrained against outward movement and defining a cavity between opposing surfaces of the fabric layer; dispensing a predetermined amount of a self-expanding, self-curable, uncured structural foam into the cavity, the foam expanding and curing in the cavity at a molding pressure determined by the predetermined amount of the foam and thereby attaching itself to the fabric layer to form the composite structure, the molding pressure causing the expanding foam to substantially fill only interstices of an inner portion of the fabric layer, without substantially penetrating an outer portion of the fabric layer; and, freeing the cured composite structure from the constraint of the arranging step, the outer portion of the fabric layer of the composite structure being thereafter substantially completely saturable with a curable material for lamination to another structure in a subsequent processing step. The method can further comprise the step of laminating the cured composite structure to another composite structure by saturating the outer portion of the fabric layer of the cured composite structure with a curable resin.

US 2002/0178992 A1 relates to a conformable composite reinforcing member which includes a cavity formed at least in part from a fabric layer and at least a first foam core and at least a second foam core positioned within the cavity. The second foam core has a relatively higher rigidity than the first foam core. The first foam core is preferably made from an open cell or flexible foam and the second foam core is preferably made from a rigid open cell foam.

WO 2009/102414 A1 discloses a fiber reinforced core panel having a first side and an opposing second side. The core panel contains a series of adjacent low density strips having at least three faces. The major face of each strip is disposed within the first or second side of the core panel and the major face of each strip is disposed within an opposite face of the core panel than the major face of the adjacent strips. The core panel also contains a continuous fibrous reinforcement sheet which is threaded through the low density strips such that the fibrous reinforcement sheet is disposed between adjacent strips and adjacent to the major faces of the low density strips. The reinforcement sheet forms at least about sixty five percent of the surface area of the first side and at least about sixty five percent of the surface area of the second side of the core panel.

EP 1 310 351 A1 discloses a method for making a windmill blade whereby problems with glue joints and with exposure of the workers to environmentally hazardous substances are avoided. This is effected by making the windmill blade in a closed mould with a mould core inside mould parts for formation of a mould cavity, in which fiber material and core material are placed. After applying vacuum to the mould cavity, matrix material is injected via a filling pipe, which is placed at a downwardly oriented side edge of the blade during the filling. Hereby is established a flow front which is used for indicating complete filling when this reaches the trailing edge of the blade and penetrates out through overflow apertures.

A further example for the use of layered composites is given in WO 2011/069975 A1 which relates to the use of layer superstructures in the production of rotor blades for wind power plants and to rotor blades for wind power plants.

The complexity of these processes is disadvantageous as it leads to higher production costs or a limited potential for automatic production of the sandwich elements.

SUMMARY

The present invention has the object of at least partially overcoming the drawbacks in the art. In particular, the present invention has the object of providing a simplified method for the production sandwich elements useful for the production of rotor blades or other composite articles.

According to the invention this object is achieved by a method of manufacturing a composite panel, comprising the steps of:
a) Providing a first textile layer;
b) Applying a first adhesive to at least a portion of the first textile layer;
c) Placing a plurality of first profiles adjacent to each other onto at least a portion of the first textile layer which has been contacted with the first adhesive,
   wherein each of the first profiles comprises a foam core and a reinforcement fabric located on the foam core and
   wherein each of the first profiles is obtained by bonding a respective foam core to a respective pre-formed reinforcement fabric;
d) Applying a second adhesive to at least a portion of the reinforcement fabrics of the first profiles;
e) Placing, at least once, at least one second profile between two first profiles; and
f) Providing a second textile layer onto the at least one second profile.

The method according to the invention allows for a simplified continuous production of sandwich elements or composite panels.

Another aspect of the present invention is a composite panel obtainable, preferably obtained, by a method according to the invention. The present invention also contemplates the use of such a composite panel for the manufacture of rotor blades for wind energy systems, of panels (preferably floor panels or floors in general) for reefer containers or of panels for trailers.

The present invention will be further described with reference to the following embodiments and figures without wishing to be limited by them. The embodiments may be combined freely unless the context clearly indicates otherwise.

BRIEF DESCRIPTIONS OF THE DRAWINGS

DETAILED DESCRIPTION OF A PREFERRED EMBODIMENT

Figure 1:
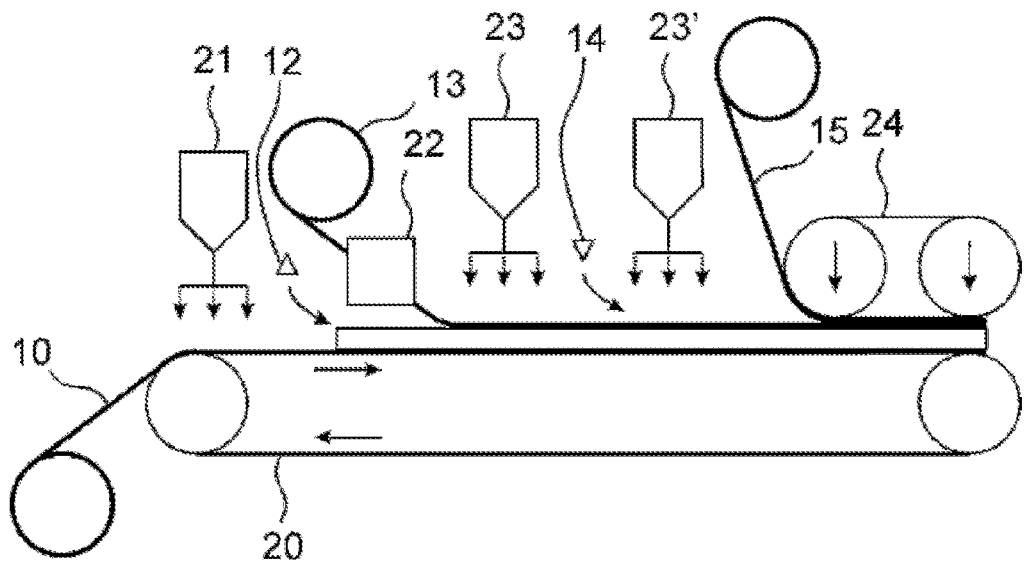
FIG. 1 shows a method according to the invention

FIG. 1 schematically shows the execution of a method according to the invention. A first textile layer 10 is provided on a conveyor belt 20. By means of spraying apparatus 21 a first adhesive is applied to at least a portion of the first textile layer 10. This is followed by placing a plurality of first profiles adjacent to each other onto at least a portion of the first textile layer 10 which has been contacted with the first adhesive.

The first profile comprises a foam core 12 and a reinforcement fabric 13 which is located on the foam core 12. In the present invention it is provided that each of the first profiles is obtained by bonding a respective foam core 12 to a respective pre-formed reinforcement fabric 13. It is understood that the term "pre-formed" as used in the present invention refers to a deliberately given shape of the fabric and excludes a flat fabric. For example, the reinforcement fabric 13 may be drawn from a roll and formed by forming apparatus 22 to conform to the outer shape of foam core 12. Then the formed reinforcement fabric 13 may be placed onto foam core 12. Forming the fabric may be effected easily by folding or creasing. If a triangular cross-section of the profile is desired, the fabric 13 would be folded in a "V" shape and the upwardly open cavity of the "V" would receive the foam.

For reasons of clarity it should be appreciated that the foam core(s) 12 and the reinforcement fabric(s) 13 form the first profile(s) as discussed here. Therefore, FIG. 1 does not show pre-made first profiles. The reinforcement fabric 13 may also be a prepreg.

Preferably, the first profiles are placed so that their longitudinal direction corresponds to the transport direction of the conveyor belt 20. Therefore, in FIG. 1 the plurality of the adjacent first profiles is depicted as a rectangular cross-sectional view.

In a subsequent step a second adhesive is applied to at least a portion of the reinforcement fabrics 13 of the first profiles using spraying apparatus 23. Then, at least once, a second profile 14 is placed between two first profiles. It is preferred that all spaces between the first profiles are used. If, as it is the case in FIG. 1, the first profiles have a triangular cross-section with their apexes facing upwards, then the second profiles should also have a triangular cross-section and should be placed into the spaces with their apexes facing downwards. This is to occupy as much space as possible.

Spraying apparatus 23' applies another adhesive and a second textile layer 15 is then placed onto the at least one second profile 14. It is of course preferred that the entire composite article is provided with this second textile layer 15. The second textile layer 15 may also be drawn from a roll. The composite article obtained now may be pressed together using roll system 24.

With respect to the first 10 and/or second textile layer 15, suitable materials include sized or unsized fibers such as glass fibers, carbon fibers, steel fibers, iron fibers, natural fibers, aramid fibers, polyethylene fibers, basalt fibers or carbon nanotubes (CNTs). Biaxially oriented materials are especially suited. Suitable materials for the foam include duroplastic polymers. The raw density of the foam core 1 (DIN EN 1602) may preferably be in a range of 30 kg/m$^3$ to 60 kg m$^3$. Particularly useful foam materials for the foam core(s) 12 are polyurethane foams as described further below.

Figure 2:
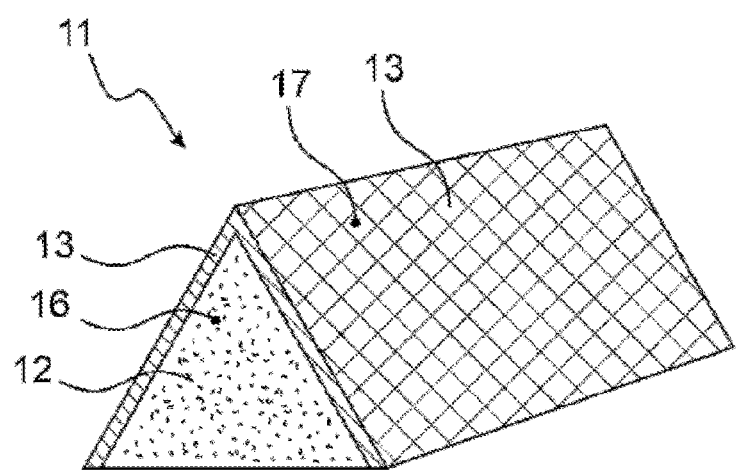
FIG. 2 shows a profile for use in a method according to the invention

FIG. 2 shows a composite profile for use in a method according to the invention. The foam core 12 has a triangular cross-section in its longitudinal direction. Depending on the intended use of the profile cross-sections with more corners, such as four, five or six corners, are within the scope of the invention. It is also within the scope of the present invention that the triangles, rectangles, etc. display rounded corners.

In accordance with viewing the composite profile as prism-shaped, FIG. 2 shows further geometrical descriptors for further clarification: a frontal face 16 to which an opposing frontal face on the other side corresponds (not shown) and a side face 17 to which two further side faces (not shown) correspond.

Two adjacent side faces 17 are in direct contact with the reinforcement fabric 13. In the case of a triangular cross-section all side faces are adjacent to each other. With a higher number of corners present this is not automatically the case.

By reinforcement fabric is meant a fabric which when added to a composite material enhances the structural properties of the material. Materials suitable for the reinforcement fabric 13 include sized or unsized fibers such as glass fibers, carbon fibers, steel fibers, iron fibers, natural fibers, aramid fibers, polyethylene fibers, basalt fibers or carbon nanotubes (CNTs). The use of continuous fibers is preferred.

According to the invention it is provided that the reinforcement fabric 13 is a woven textile or an at least bidirectionally oriented non-woven textile. It is possible that the reinforcement fabric 13 comprises more than one fiber layer. Then the fiber orientation may also vary from layer to layer. For example, multidirectional fiber layers are contemplated in which unidirectional or woven layers are stacked upon each other.

The composite profile may generally have an at least triangular cross-section in its longitudinal direction. With this cross-section of the profile curved bodies may be constructed without having undesired voids (as in the case with balsa wood profiles) into which additional resin, adding to the total weight, may accumulate.

The bonding between foam core 12 and the reinforcement fabric 13 should, as it is customary for fiber reinforced composites, be able to transfer mechanical forces acting upon the composite. Therefore a substance-to-substance connection is preferred. Using appropriate caution, an adhesive may be employed.

With respect to the contact between the foam core 12 and the reinforcement fabric 13 it is here provided that the foam core does not or not completely penetrate into the reinforcement fabric 13. By this it is achieved that the voids or interstices in the fabric are not sealed by the foam. Ideally there is only a superficial contact which does not extend into the depth of the fabric.

In the present invention on at least one side face 3 of the composite profile the foam core 1 is exposed. The term "exposed" is to be understood in such a manner that in the profile the side face is or side faces are not permanently covered, especially not covered by a reinforcement fabric or other woven or non-woven textiles. For example, in the downward oriented side face of the composite profile as depicted in FIG. 2 is the foam core 12 is exposed.

In accordance with the foregoing, in one embodiment of the method according to the invention the first 11 and/or the second profile 14 are a composite profile comprising at least one of:
- a foam core 12 with opposing frontal faces 16 and a plurality of side faces 17; and
- a reinforcement fabric 13 which is at least partially in direct contact with at least two adjacent side faces 17;

wherein
the reinforcement fabric 13 is a woven textile or an at least bidirectionally oriented non-woven textile;
the foam core 12 does not or not completely penetrate into the reinforcement fabric 13; and
at least on one side face 17 of the composite profile the foam core 12 is exposed.

It is understood that the term "comprising at least one of" in the present invention has the meaning of "comprising at least one each of". It is further understood that the reinforcement fabric 13 is at least partially in direct contact with at least two adjacent side faces 17 of said foam core 12. Due to the fact that the foam core 12 does not or not completely penetrate into the reinforcement fabric 13, it is achieved that the voids or interstices in the fabric are not sealed by the foam. Ideally there is only a superficial contact which does not extend into the depth of the fabric.

Preferably, in the composite profile the foam core 12 has a triangular cross-section and a ratio of length to width of at least 5:1, preferably 20:1. It is also preferred that the triangle defined by the cross-section 12 is an equal-sided or equilateral triangle.

It is also preferred that in the first 11 and/or second profile 14 the foam core 12 comprises a polyurethane foam (PU foam), an epoxy resin foam (EP foam), a polyester resin foam (in particular an unsaturated polyester resin foam; UP foam), an expanded polystyrene foam (EPS foam) and/or an expanded polypropylene foam (EPP foam). Other expanded polyolefin foams or further thermoplastic or duroplastic foams are also possible.

Polyurethane foams are generally known and can be obtained by the reaction of polyisocyanates with compounds having at least two NCO-reactive hydrogen atoms such as polyols, polythiols and/or polyamines in the presence of chemical and/or physical blowing agents or by mechanical frothing.

The polyol component useful herein is composed of one or more polyol(s) with a molecular weight of from about 60 to 7000 g/mol and contains 2 to 8 reactive groups. Such polyols are generally known in the art and include polyethers, polyether amines, polyesters, polyester amides and polycarbonates. Polyether and/or polyester polyols are generally preferred.

Polyethers are known in the art and are generally prepared by alkylene oxide adducts of diols, triols and higher functionality polyols and/or polyamines Such diols, triols and higher functionality polyols include, as none limiting examples, ethylene glycol, propylene glycol, ethylenediamine, diethylene glycol, triethylene glycol, dipropylene glycol, diethylenetriamine, 1,3-butanediol, 1,4-butanediol, neopentyl glycol, 1,6-hexanediol, toluenediamine, hydroquinone bis(2-hydroxyethyl)ether, diphenylmethanediamine, glycerol, trimethylol propane, diethylenetriamine, triethanolamine, 1,2,4-butanetriol, pentaerythritol, diglycerol, sugars, and other low molecular weight polyols. Suitable alkylene oxide include, as none limiting examples, ethylene oxide, 1,2-propylene oxide, or 1,2-butylene, or mixtures thereof. Other polyethers useful herein are known in the art as polyoxymethylene (POM), polytetrahydrofuran (PTHF), polyphenyl ether (PPE), or poly(p-phenylene oxide) (PPO).

Polyesters are also known in the art and are generally prepared by the condensation of a diols, triols and higher functionality polyols and an aliphatic and/or aromatic dicarboxylic acid and include, as none limiting examples, adipic acid, succinic acid, glutaric acid, azelaic acid, sebacic acid, malonic acid, maleic acid, fumaric acid, caprolactone, phthalic acid, isophthalic acid, terephthalic acid, tetrachlorophthalic acid, chlorendic acid and the acid anhydride and acid halides of these acids. Suitable diols, triols and higher functionality polyols and combinations thereof may be, as none limiting examples, ethylene glycol, propylene glycol, diethylene glycol, triethylene glycol, dipropylene glycol, 1,2-cyclopentanediol, 1,2-cyclohexanediol, 1,4-butanediol, neopentyl glycol, 1,6-hexanediol, hydroquinone bis(2-hydroxyethyl)ether, glycerol, 1,2,4-butanetriol, diglycerol, sugars, and other low molecular weight polyols. Other polyesters useful herein is Castor oil and derivatives thereof.

One or more cross linker(s) and/or chain extender(s) may be used in the polyurethane compositions. Suitable cross linker(s) and/or chain extender(s) are known in the art. None limiting examples include ethylene glycol, propylene glycol, ethylenediamine, diethylene glycol, triethylene glycol, dipropylene glycol, diethylenetriamine, 1,3-butanediol, 1,4-butanediol, neopentyl glycol, 1,6-hexanediol, toluenediamine, hydroquinone bis(2-hydroxyethyl)ether, diphenylmethanediamine, glycerol, trimethylol propane, diethylenetriamine, triethanolamine, 1,2,4-butanetriol, pentaerythritol, diglycerol, sugars, and other low molecular weight polyols.

One or more flame retardant(s) may also be used. Suitable flame retardant(s) are known in the art. None limiting examples include trichlorpropylphosphate, dimethylmethylphosphonate, diethylethylphosphonate, dimethylphenylpiperazinium, triethylphosphate, and other phosphonates, phosphates, and halogenated polyols.

One or more catalyst(s) may also be used. Suitable tertiary amine catalyst(s) and/or organometallic catalyst(s) and/or carboxylate urethane catalyst(s) are known in the art. None limiting examples include triethylenediamine, N,N-dimethylcyclohexylamine, tetramethylhexanediamine, tris-(3-dimethylamino)-propylamine, dibutyltindilaurat, dimethylethanolamine, dibutylbis-(dodecylthio)-stannan, potassium-2-ethylhexanoat, dibutyltinlaureate, 1,3,5-tris-(dimethylaminopropyl)-hexahydrotriazin, dimethylaminoethanol, diethylaminoethanol, pentamehtyldiethylenetriamine, methylmorpholine, ethylmorpholine, quaternary ammonium salts, 1,2-dimethylimidazole.

One or more surfactant(s) may also be used. A number of surfactants are known in the art for stabilizing and/or controlling the foam properties in polyurethane productions. None limiting examples include cell stabilizers, wetting agents, viscosity reducing agents, thixotropic agents, air release agents.

One or more physical and/or chemical blowing agent(s) known in the art may also be used. Non-limiting examples include water, formic acid, dimethoxymethane, iso-pentane, n-pentane, cyclopentane, HCFC (hydrochlorofluorocarbon) compounds, HFC (hydrofluorocarbon) compounds and mixtures thereof.

Suitable polyisocyanate components include the known aliphatic, cycloaliphatic and aromatic di- and/or polyisocyanates. Examples are 1,4-butylenediisocyanate, 1,5-pentanediisocyanate, 1,6-hexamethylenediisocyanate (HDI), isophorondiisocyanate (IPDI), 2,2,4- and/or 2,4,4-trimethylhexamethylenediisocyanate, bis(4,4'-isocyanatocyclohexyl)methane or mixtures with the other isomers, 1,4-cyclohexylenediisocyanate, 1,4-phenylenediisocyanate, 2,4- and/or 2,6-toluylenediisocyanate (TDI), 1,5-naphthylenediisocyanate, 2,2'- and/or 2,4'- and/or 4,4'-diphenylmethanediisocyanate (MDI) and/or higher homologues (pMDI), 1,3- and/or 1,4-bis-(2-isocyanatoprop-2-yl)-benzene (TMXDI) and 1,3-bis-(isocyanatomethyl)benzene (XDI).

A preferred polyisocyanate is MDI and especially mixtures of MDI and polymeric MDI. The mixtures of MDI and pMDI preferably have a monomer content between 40 weight-% and 100 weight-%. The NCO content of the polyisocyanate employed should be above 25 weight-%, preferably above 31.4 weight-%. It is also preferred that the MDI employed has a combined content of the 2,2' isomer and 2,4' isomer of at least 3 weight-%, preferably at least 20 weight-% and more preferred at least 40 weight-%.

The polyurethane reaction mixture may also comprise known additives such as fillers. Preferred fillers are carbon nanotubes, barium sulfate, titanium dioxide, short glass fibers or natural fibrous or platelet-formed minerals such as wollastonite or muskowite.

It is further preferred that in the first 11 and/or second profile 14 the foam core 12 comprises a polyurethane foam obtainable by the reaction of a mixture comprising:

Component A: a polyol formulation, comprising:

(a) One or more polyether polyol(s) and/or one or more polyester polyol(s) and/or polyamines with hydroxyl number(s) from between 12 and 1200 mg KOH/g, and molecular weight(s) from between 60 and 7000 g/mol, and functionality from between 2 and 8, preferably with hydroxyl number(s) from between 150 and 600 mg KOH/g, and molecular weight(s) from between 300 and 1200 g/mol, and functionality from between 2 and 4;

(b) None, one or more cross linker(s) and/or chain extender(s) with hydroxyl number(s) from between 500 and 2000 mg KOH/g, and molecular weight(s) from between 60 and 400 g/mol, and functionality from between 2 and 8, preferably with hydroxyl number(s) from between 1000 and 2000 mg KOH/g, and molecular weight(s) from between 60 and 160 g/mol, and functionality from between 2 and 3;

(c) One or more amine and/or organometallic and/or metallic catalyst(s), preferably organic tertiary amine(s);

(d) None, one or more flame retardant(s) which may be halogenated, preferably a halogenated phosphate/phosphonate;

(e) One or more surfactants, preferably at least one cell stabilizer;

(f) One or more chemical and/or physical blowing agents, preferably water, and/or carboxylic acid(s), and/or hydrocarbons, and/or halogenated hydrocarbons, more preferably water and/or formic acid add/or hydrocarbons;

and

Component B: an isocyanate, comprising:

(a) Diphenylmethane diisocyanate and/or polymeric diphenylmethane diisocyanate with a preferred monomer content from between 40-100 wt-% and with an NCO-content of 25 wt-% to 35 wt-%, preferably about 30 wt-%, more preferably about 31.4 wt-%; and (b) Preferably, a MDI with at least a 3 wt-% content of 2,2'-diphenylmethane diisocyanate and 2,4'-diphenylmethane diisocyanate, preferably at least 20 wt-%, more preferably at least 40 wt-%.

It is also preferred that in the first 11 and/or second profile 14 the reinforcement fabric 13 comprises glass fibers, carbon fibers and/or aramid fibers.

As already mentioned, the reinforcement fabric 13 is a woven textile or an at least bidirectionally oriented non-woven textile. It is possible that the reinforcement fabric 13 comprises more than one fiber layer. Then the fiber orientation may also vary from layer to layer. For example, multidirectional fiber layers are contemplated in which unidirectional or woven layers are stacked upon each other. It is preferred that the reinforcement fabric 13 is a biaxial non-woven fabric with at least a portion of the fibers oriented in an angle of 40° to 50° with respect to the longitudinal axis of the profile.

With respect to the reinforcement fabric, it is further preferred that in the first 11 and/or second profile 14 the reinforcement fabric 13 is in a one-part form. Advantages of this include a higher mechanical stability of the edges of the profile. Preferably the reinforcement fabric 13 is not broken, but at the most bent into shape without breaking or creasing the fibers of the fabric. It is also easy to accomplish the covering of two adjacent sides of the foam core 12 with a fabric 13.

It is also preferred that in the first 11 and/or second profile 14 the foam core 12 is bonded to the reinforcement fabric 13 without the use of an additional adhesive. This may be achieved by contacting a not completely cured foam which still possesses a residual tackiness to the reinforcement fabric 13 and then allowing the foam to cure further. At the same time the foam should have such a high viscosity that no penetration into the fabric 13 takes place. An advantage of this embodiment is that in a subsequent resin infusion during the course of using the profile as a distance element in hollow bodies the resin can contact the fabric 13 as well as the foam core 12.

Figure 3:
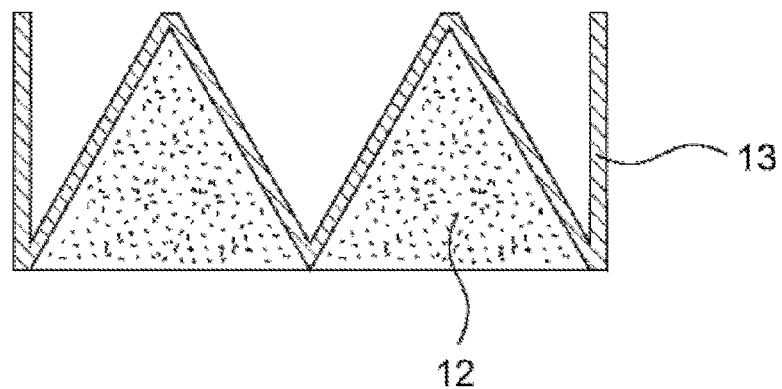
FIG. 3 shows another profile for use in a method according to the invention

FIG. 3 shows another composite profile for use in a method according to the invention. Here there is more than one foam core 12 in the profile and, independently, the outermost side walls of the reinforcement fabric 13 are in a different angle than the interior side walls. In this respect, in another embodiment of the method according to the invention the first 11 and/or second profile 14 comprise a plurality of foam cores 12 in contact with the reinforcement fabric 13. It can also be seen that the reinforcement fabric 13 is a single, one-piece reinforcement fabric.

In another embodiment of the method according to the invention the method further comprises the steps of:

g) Providing a foam core 12;

h) Connecting the foam core 12 with a pre-formed reinforcement fabric 13 under formation of a first 11 and/or second profile 14.

This is to be understood in such a manner that no pre-formed first 11 and/or second profiles 14 are employed, but that they are, referring to FIG. 1, rather directly manufactured during the course of the method according to the invention.

Figure 4:
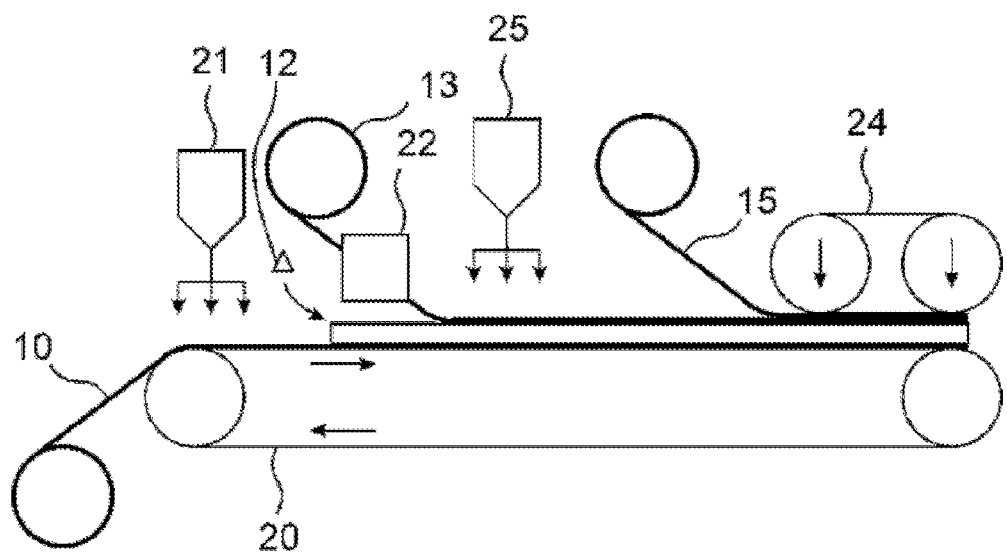
FIG. 4 shows another method according to the invention

In another embodiment of the method according to the invention, in step e) the placing of at least one second profile 14 between two first profiles 11 is conducted in such a manner that a foam is provided between two first profiles 11, the foam contacting reinforcement fabric 13 sections of these first profiles 11 which are facing each other and the foam does not or not completely penetrate into the reinforcement fabric 13 of these first profiles 11. This is shown in FIG. 4 where foam cores 12 are arranged in connection with reinforcement fabric 13 to create first profiles with, for example, "V"-shaped cavities between them. Into these upwardly open cavities a foam is introduced by means of foaming apparatus 25. Due to the fact that the foam does not or not completely penetrate into the reinforcement fabric 13, it is achieved that the voids or interstices in the fabric are not sealed by the foam. Ideally there is only a superficial contact which does not extend into the depth of the fabric.

Preferably the foam is a spreadable foam obtained from a reaction mixture and is provided between the two first profiles 11 after the cream time of the reaction mixture. It is also preferred that the foam comprises a polyurethane foam (PU foam), an epoxy resin foam (EP foam), a polyester resin foam (in particular an unsaturated polyester resin foam; UP foam), an expanded polystyrene foam (EPS foam) and/or an expanded polypropylene foam (EPP foam). Other expanded polyolefin foams or further thermoplastic or duroplastic foams are also possible.

More preferably the reaction mixture is a polyurethane reaction mixture such as one that has been described above. The time delay between mixing of the components and the introduction of the foam into the cavity or cavities may be achieved by an appropriately long nozzle after the mixing head for the reaction mixture. Alternatively or in addition to this, a fast reacting (polyurethane) system may be employed.

It is also possible to introduce the foam after the rise time of the reaction mixture. However, it is greatly preferred that the foam has not yet reached the tack-free time.

The cream time is the time which elapses from the start of mixing of the reactants to the visible start of foaming of the mix. In many cases this can be seen clearly by a color change. The string or fiber time is the transition of the reaction mix from the liquid to the solid state. It roughly corresponds to the gel point. When this point in time is reached the reaction is about 50% complete. The fiber time is measured by, for example, a wooden rod being repeatedly immersed in and removed from the already well expanding reaction mix, and it is determined when the rod draws fibers. Time measurement begins with mixing. After fiber time, the speed at which the foam rises slows down.

The time from the start of mixing till the end of the optically perceptible rise is called the rise time. The surface of the foam is still tacky when the rise process is complete. By repeatedly testing the foam surface with a wooden rod, the moment of freedom from tack is determined. The time elapsing from the start of mixing to the moment when the surface is no longer tacky is called tack-free time.

Figure 5:
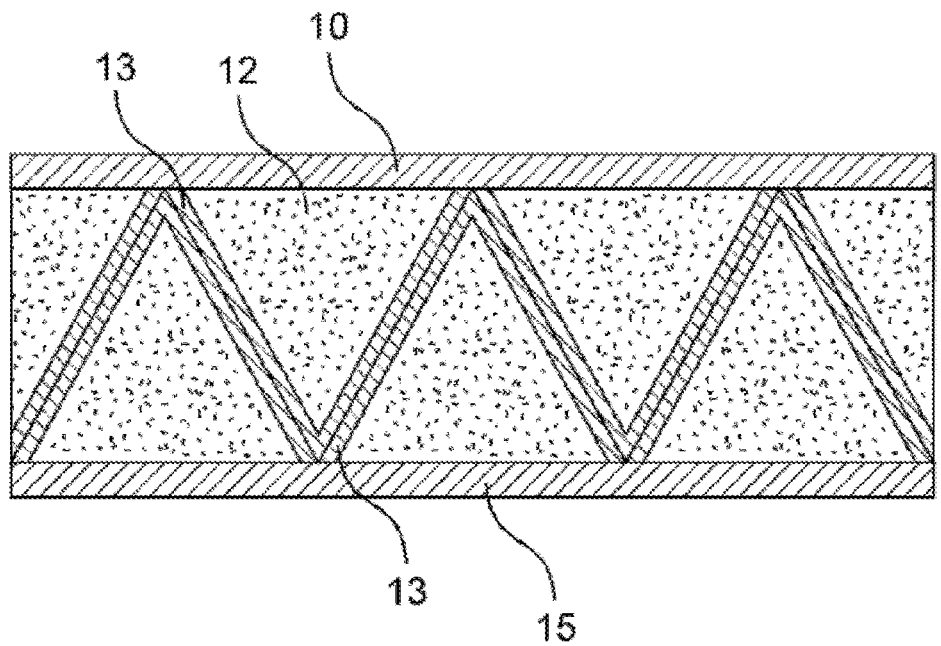
FIG. 5 shows a composite panel according to the invention

FIG. 5 shows a composite panel which can be obtained by a method according to the invention. The panel comprises a first textile layer 10 and a second textile layer 15. Between these layers alternating composite profiles with foam cores 12 and reinforcement fabrics 13 are arranged. These profiles have been described in connection with FIG. 2. For reasons of clarity, FIG. 5 does not show adhesive layers between the profiles and the textile layers 10 and 15. It is preferred that an adhesive bond exists at the contact points of reinforcement fabrics 12 with the first 10 and/or second textile layer 15.

Figure 6:
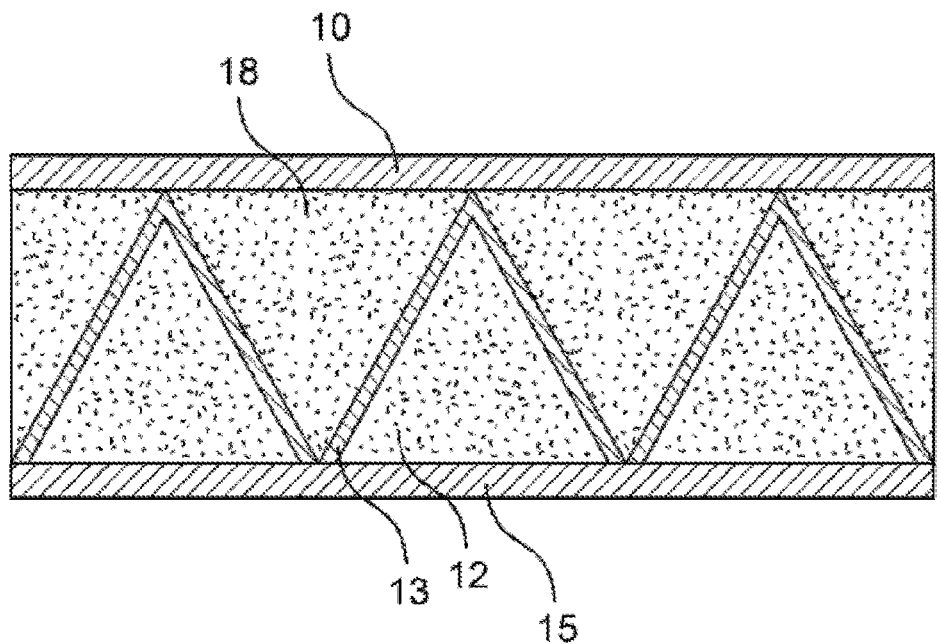
FIG. 6 shows another composite panel according to the invention

FIG. 6 shows another composite panel which can be obtained by a method according to the invention. Here, too, a first textile layer 10 and a second textile layer 15 are present. The structure can be obtained by placing composite profiles with foam cores 12 and reinforcement fabrics 13, such as have been described in FIG. 2, adjacent to each other with their apexes facing upwards. This forms "V"-shaped cavities which are upwardly open. The cavities can be provided with a foam reaction mixture or an already cured foam. In this respect, reference can be made to the method as described in connection with FIG. 4. For reasons of clarity, FIG. 6 does not show adhesive layers between the profiles and the textile layers 10 and 15. It is preferred that an adhesive bond exists at the contact points of reinforcement fabrics 13 with the first 10 and/or second textile layer 15.

Figure 7:
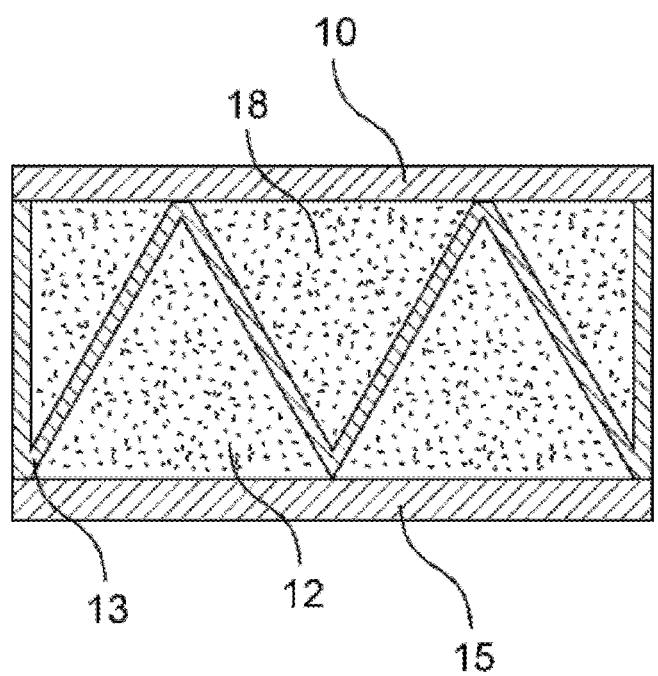
FIG. 7 shows another composite panel according to the invention

FIG. 7 shows another composite panel which can be obtained by a method according to the invention. Here, too, a first textile layer 10 and a second textile layer 15 are present. The structure can be obtained by placing a composite profiles with a foam core 12 and a reinforcement fabric 13, such as described in FIG. 3, onto the first textile layer. This forms "V"-shaped cavities which are upwardly open. The cavities can be provided with a foam reaction mixture or an already cured foam. In this respect, reference can be made to the method as described in connection with FIG. 4. For reasons of clarity, FIG. 7 does not show adhesive layers between the profiles and the textile layers 10 and 15. It is preferred that an adhesive bond exists at the contact points of reinforcement fabric 13 with the first 10 and/or second textile layer 15. Of course, several of the composite profiles may also be used.

The invention claimed is:

1. A method of manufacturing a composite panel, comprising:
providing a first textile layer;
applying a first adhesive to at least a portion of the first textile layer;
forming a reinforcement fabric to the outer shape of a plurality of first profiles by folding or creasing using a forming apparatus;
placing or forming a plurality of first profiles adjacent to each other onto at least a portion of the first textile layer which has been contacted with the first adhesive,
wherein each of the first profiles comprises a foam core and the reinforcement fabric located on the foam core, and
wherein each of the first profiles is obtained by bonding a respective foam core to the pre-formed reinforcement fabric;
applying, at least once, at least one second profile between two first profiles in such a manner that a foam is provided between two first profiles, wherein the foam, when applied, is not completely cured and still possesses a residual tackiness to the reinforcement fabric such that it bonds to the reinforcement fabric with superficial contact which does not extend into the depth of the fabric;

testing the foam to determine tackiness; and providing a second textile layer onto the at least one second profile.

2. The method according to claim 1, wherein at least one of the first and/or the second profile are a composite profile comprising at least one each of:

a foam core with opposing frontal faces and a plurality of side faces of said foam core; and the reinforcement fabric which is at least partially in direct contact with at least two adjacent side faces, wherein:

the reinforcement fabric is a woven textile or an at least bi-directionally oriented non-woven textile, the foam core does not or not completely penetrate into the reinforcement fabric, and at least on one side face of the composite profile the foam core is not permanently covered by the reinforcement.

3. The method according to claim 2, wherein in at least one of the first and/or second profile the foam core comprises a polyurethane foam, an epoxy resin foam, a polyester resin foam, an expanded polystyrene foam and/or an expanded polypropylene foam.

4. The method according to claim 2, wherein in at least one of the first and/or second profile the foam core comprises a polyurethane foam obtainable by reaction of a mixture comprising:

component A, wherein: component A is a polyol formulation comprising:

one or more polyether polyol(s) and/or one or more polyester polyol(s) and/or polyamines with hydroxyl number(s) from 12 to 1200 mg KOH/g, and molecular weight(s) from 60 to 7000 g/mol, and functionality from 2 to 8;

none, one or more cross linker(s) and/or chain extender(s) with hydroxyl number(s) from 500 to 2000 mg KOH/g, and molecular weight(s) from 60 to 400 g/mol, and functionality from 2 to 8;

one or more amine and/or organometallic and/or metallic catalyst(s);

none, one or more flame retardant(s) which may be halogenated;

one or more surfactants; and one or more chemical and/or physical blowing agents; and component B, wherein component B is an isocyanate comprising:

diphenylmethane diisocyanate and/or polymeric diphenylmethane diisocyanate optionally with a monomer content from 40-100 wt. % and with an NCO-content of 25 wt. % to 35 wt.-%.

5. The method according to claim 2, wherein in at least one of the first and/or second profile the reinforcement fabric comprises glass fibers, carbon fibers and/or aramid fibers.

6. The method according to claim 2, wherein in at least one of the first and/or second profile the reinforcement fabric is a biaxial non-woven fabric with at least a portion of the fibers oriented in an angle of 40° to 50° with respect to the longitudinal axis of the foam core.

7. The method according to claim 2, wherein in at least one of the first and/or second profile the reinforcement fabric is in a one-part form.

8. The method according to claim 2, wherein in at least one of the first and/or second profile the foam core is bonded to the reinforcement fabric without an additional adhesive.

9. The method according to claim 1, wherein the foam comprises a polyurethane foam, an epoxy resin foam, a polyester resin foam, an expanded polystyrene foam and/or an expanded polypropylene foam.

10. A method of manufacturing a composite panel, the method comprising:

providing a first textile layer;

applying a first adhesive to at least a portion of the first textile layer;

forming a plurality of first profiles adjacent to each other onto at least a portion of the first textile layer which has been contacted with the first adhesive, wherein:

each of the first profiles comprises a foam core and a reinforcement fabric located on the foam core, and each of the first profiles is obtained by bonding a respective foam core to a pre-formed reinforcement fabric;

applying, at least once, at least one second profile between two first profiles in such a manner that a foam is provided between two first profiles, wherein the foam, when applied, is not completely cured and still possesses a residual tackiness to the reinforcement fabric such that it bonds to the reinforcement fabric with superficial contact which does not extend into the depth of the fabric;

testing the foam to determine tackiness; and providing a second textile layer onto the at least one second profile.

11. The method of claim 10, wherein the step of testing further comprises:

repeatedly testing with a wooden rod.

* * * * *